United States Patent [19]

Decoene et al.

[11] Patent Number: 4,566,379
[45] Date of Patent: Jan. 28, 1986

[54] ROUND BALER WITH VERTICALLY ELONGATED STARTING CHAMBER

[75] Inventors: Frans J. G. C. Decoene; Marc G. Vansteelant, both of Zedelgem, Belgium

[73] Assignee: Sperry Corporation, New Holland, Pa.

[21] Appl. No.: 612,101

[22] Filed: May 18, 1984

[51] Int. Cl.⁴ .............................................. B30B 3/04
[52] U.S. Cl. ........................................ 100/89; 56/341
[58] Field of Search ...................... 100/88, 89; 56/341, 56/342, 343, 344

[56] References Cited

U.S. PATENT DOCUMENTS

| | | |
|---|---|---|
| 2,597,962 | 5/1952 | Whitley . |
| 4,176,596 | 12/1979 | Sacht ................................. 56/341 X |
| 4,330,985 | 5/1982 | Shindler ................................. 56/341 |
| 4,470,247 | 9/1984 | Mast ................................. 100/88 X |

FOREIGN PATENT DOCUMENTS 2626263 12/1977 Fed. Rep. of Germany ........ 56/341
2042972 9/1982 United Kingdom .

*Primary Examiner*—Peter Feldman
*Attorney, Agent, or Firm*—Darrell F. Marquette; Frank A. Seemar; Larry W. Miller

[57] ABSTRACT

A round baler includes a base and rear frame. A first set of rollers is mounted in the base frame and extends transversely thereof. A pair of arms are pivoted on the rear frame, and a second set of rollers is carried by the arms extending transversely between the arms. The arms are movable between a bale starting position and a full bale position, and the second set of rollers cooperate with at least part of the first set of rollers to define a bale starting chamber that is vertically elongated when the arms are in the bale starting position.

14 Claims, 6 Drawing Figures

ROUND BALER WITH VERTICALLY ELONGATED STARTING CHAMBER

BACKGROUND OF THE INVENTION

This invention relates generally to roll baling machines, typically referred to as round balers which form cylindrical roll bales of crop material.

U.S. Pat. No. 4,198,804 discloses a conventional type of round baler having a two part frame with rollers extending transversely between the side walls of the frame. The rollers are stationarily mounted on the frame to define a generally cylindrical baling zone which has a fixed diameter. The two parts of the baler frame are pivotally connected so that the baling zone may be opened to discharge a bale therefrom. A disadvantage of this type of baler is that it is often difficult and sometimes impossible to form bales when working in short brittle crop material. Another disadvantage is that the bales produced with this type of baler have a soft core and often have a low density.

SUMMARY OF THE INVENTION

The present invention provides a round baler having a base frame, a rear frame pivotally connected to the base frame, and a first set of rollers mounted in the base frame and extending transversely of the base frame. Arm means are provided on the rear frame, and a second set of rollers are carried on the arm means and extending transversely of the rear frame. The first and second sets of rollers cooperate to form a round bale of crop material. The arm means is moveable between a bale starting position and a full bale position. The second set of rollers cooperates with at least part of the first set of rollers to define a bale starting chamber when the arm means is in the bale starting position. The bale starting chamber is elongated in a generally vertical direction.

DESCRIPTION OF THE PREFERRED EMBODIMENT

Figure 1:
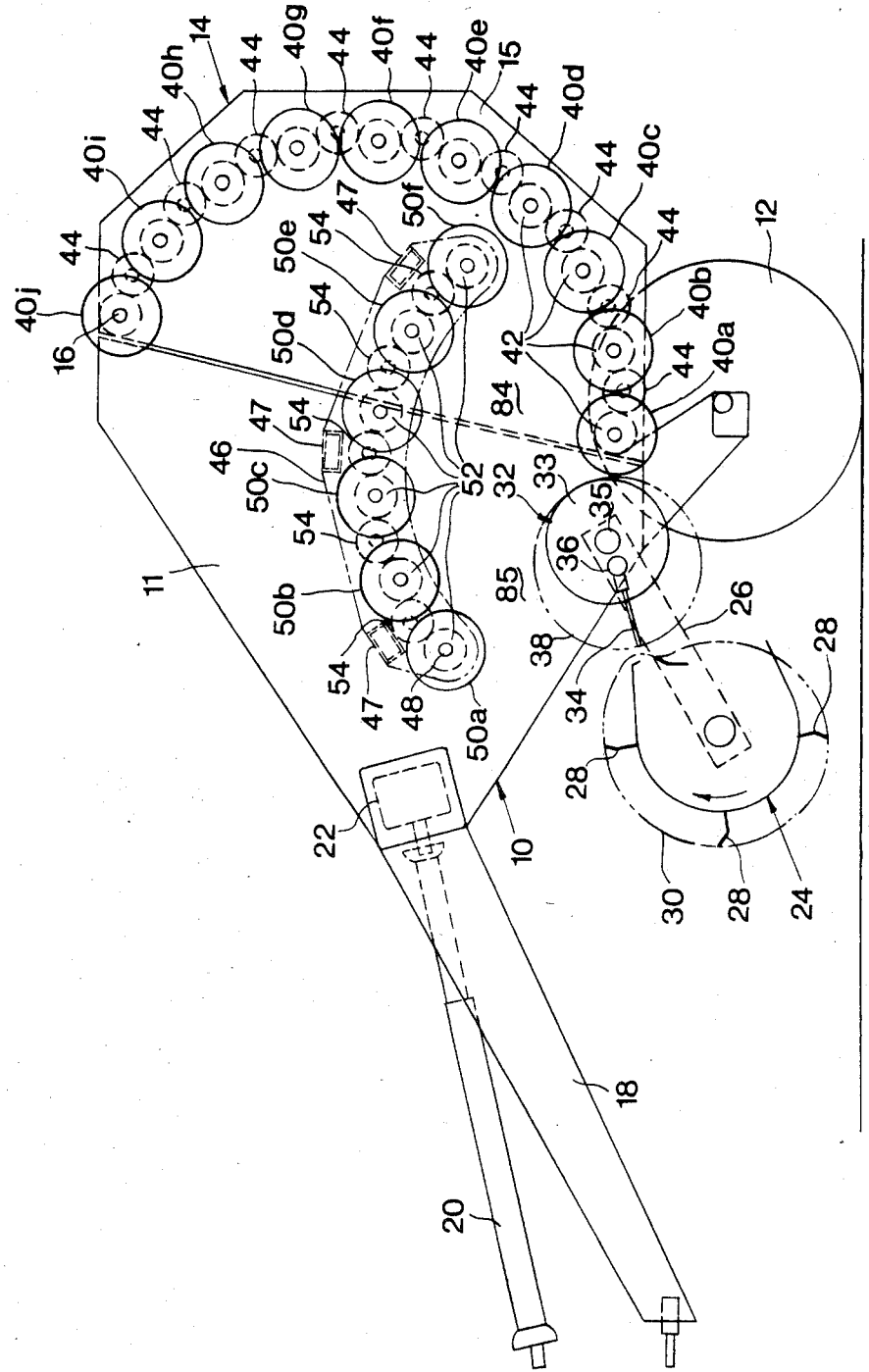
FIG. 1 is a side elevational view of a round baler according to one embodiment of the present invention taken when the baler is empty.

Referring to FIG. 1, a round baler according to one embodiment of the present invention includes a base frame 10 supported by a pair of wheels 12 and a rear frame 14 pivotally connected to the base frame 10 by stub shafts 16 mounted in suitable bearings. The side walls 11 of the base frame 10 are generally triangular in shape, and the side walls 15 of the rear frame 14 are generally trapezoidal in shape. A tongue 18 is provided on the forward end of the base frame 10 for connection to a towing vehicle such as a tractor (not shown). A drive shaft 20 is adapted for connection at one end to the PTO of the tractor and at the other end to a gearbox 22 carried on the base frame 10.

A pickup 24 extends transversely of the base frame 10 and is supported by brackets 26 which are attached to the side walls 11 of the base frame 10. The pickup 24 includes a series of fingers or tines 28 moveable in a path designated 30. A feeder drum 32 is rotatably mounted on the base frame 10 and extends transversely between the sidewalls 11 thereof. The feeder drum 32 includes a cylinder 33 and a plurality of fingers 34 mounted on a shaft 36 that is eccentrically offset with respect to the shaft 35 on which the cylinder 33 is mounted. As the cylinder 33 is rotated by the shaft 35, the fingers 34 retract into and project from openings in the cylinder 33. The tips of the fingers 34 follow a path designated 38.

A set of rollers 40a through 40j is rotatably mounted in fixed positions in the rear frame 14 and extend transversely between the side walls 15 of the rear frame 14. Spur gears 42 are fixed to one end of each of the rollers 40a to 40j inside the adjacent side wall 15, and intermediate gears 44 are rotatably mounted on the inside of the same side wall 15 of the rear frame 14 in intermeshing engagement with the spur gears 42.

Figure 2:
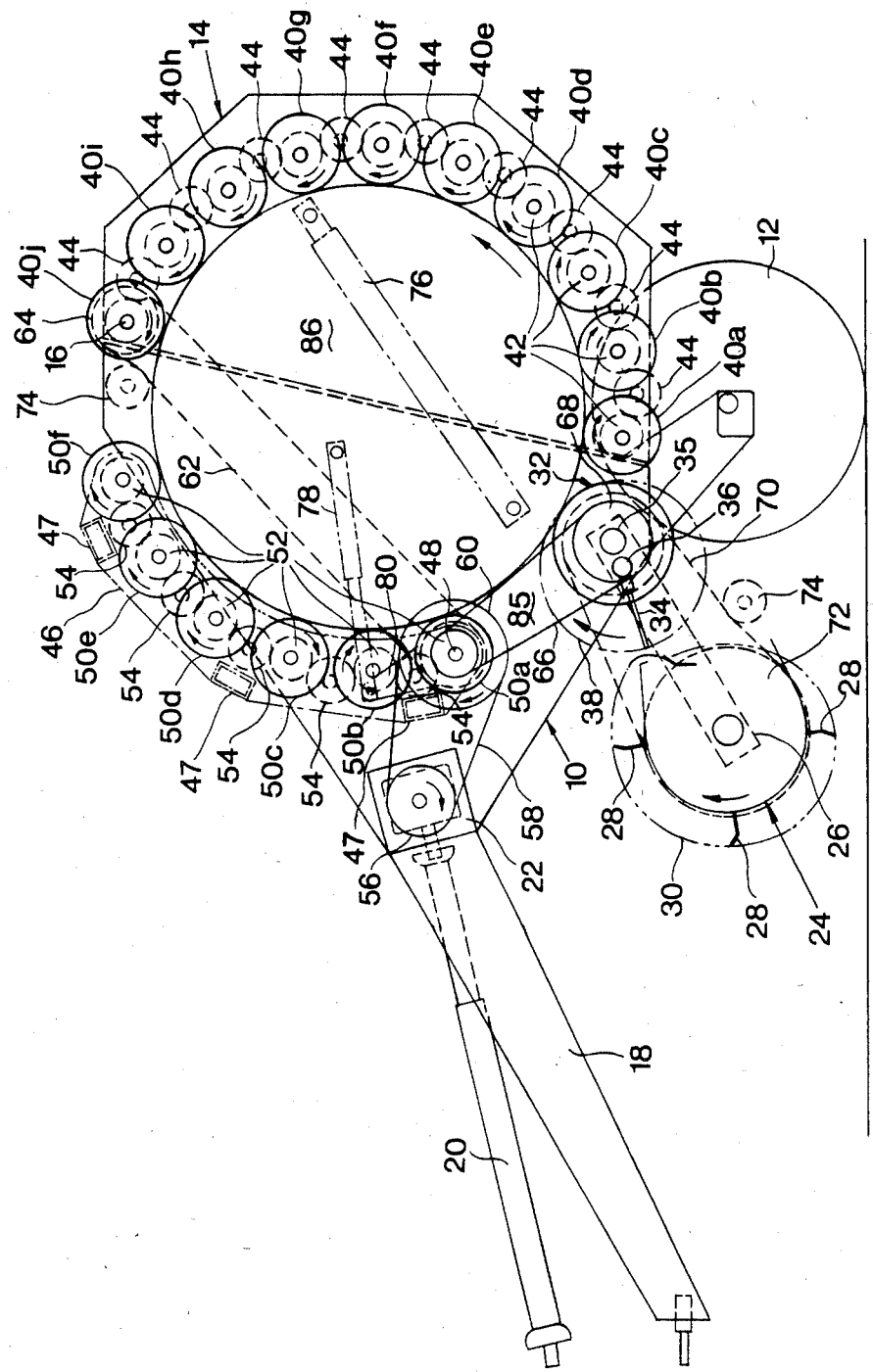
FIG. 2 is a side elevational view of the baler of FIG. 1 taken when the baler has formed a bale.

A pair of arms 46 are pivoted at one end on stub shafts 48 mounted in the side walls 11 of the base frame 10 for movement between a bale starting position shown in FIG. 1 and a full bale position shown in FIG. 2. The arms 46 are interconnected by beams 47 which extend transversely of the base frame 10. Another set of rollers 50a through 50f is rotatably carried on the arms 46 and extends transversely between the arms 46. Spur gears 52 are fixed to one end of each of the rollers 50a through 50f on the inside of the adjacent arms 46, and intermediate gears 54 are rotatably carried on the inside of the same arm 46 in intermeshing engagement with the spur gears 52.

The rollers 40a through 40j and the rollers 50a through 50f each consist preferably of a hollow drumlike member formed of sheet metal mounted on a shaft which extends longitudinally of the drumlike member. The ends of the shaft project from the drumlike member and are rotatably mounted in suitable bearings disposed in either the sidewalls 15 of the rear frame 14 or in the arms 46. The shaft of the roller 40j is coaxial with and fixed to the stub shafts 16, and the shaft of the roller 50a is coaxial with and fixed to the stub shafts 48.

Figure 4:
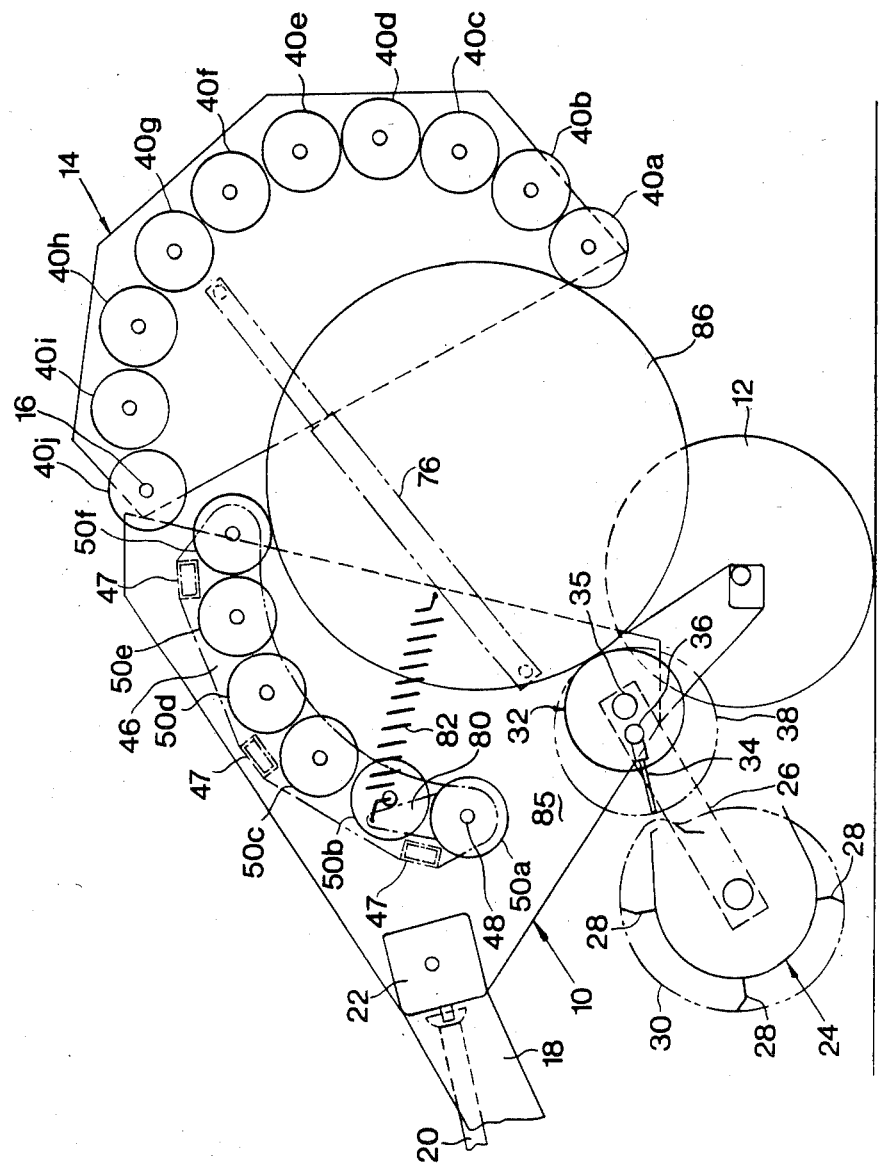
FIG. 4 is a view similar to FIG. 3 showing a modification of the baler of FIG. 1.

The drive system for operating the various parts of the baler is shown in FIG. 2. A sprocket 56 is fixed to the output shaft of the gearbox 22, and a chain 58 connects the sprocket 56 to a triple sprocket arrangement 60 which is fixed to one of the stub shafts 48 to drive the roller 50a. A chain 62 connects the triple socket arrangement 60 to a sprocket 64 fixed to one of the stub shafts 16 to drive the roller 40j. Another chain 66 connects the triple socket arrangement 60 to a sheave and sprocket combination 68 that is fixed to the shaft 35 of the feeder drum 32. A belt 70 connects the sheave and sprocket combination 68 to a sheave 72 on the pickup 24. Idlers 74 are provided to maintain proper tension in the chain 62 and in the belt 70. A pair of hydraulic cylinders 76 are connected between the side walls 11 of the base frame 10 and the side walls 15 of the rear frame 14. Another pair of hydraulic cylinders 78 are connected between lever portions 80 of the arms 46 and the side walls 11 of the base frame 10. Alternately, as seen in FIG. 4, the hydraulic cylinders 78 may be replaced by a pair of springs 82 connected between the lever portions 80 of the arms 46 and the side walls 11 of the base frame 10.

Rotary driving power is delivered from the PTO of the tractor through the drive shaft 20 and the gearbox 22 to rotate the sprocket 56 in a clockwise direction as indicated in FIG. 2. This rotation of the sprocket 56 causes the triple sprocket arrangement 60 to be rotated clockwise by the chain 58, resulting in concurrent clockwise rotation of the roller 50a. Due to the spur gears 52 and the intermediate gears 54, the other rollers 50b through 50f carred on the arms 46 are also rotated clockwise. The roller 40j mounted in the rear frame 14 is rotated clockwise by the chain 62 and the sprocket 64. Due to the spur gears 42 and the intermediate gears 44, the remaining rollers 40a through 40i mounted in the rear frame 14 are also rotated clockwise. The feeder drum 32 is also caused to rotate in a clockwise direction by the chain 66 which, in turn, causes the fingers 34 to move along the path 38. The fingers 28 of the pickup 24 are caused to rotate in the path 30 by the belt 70.

Figure 3:
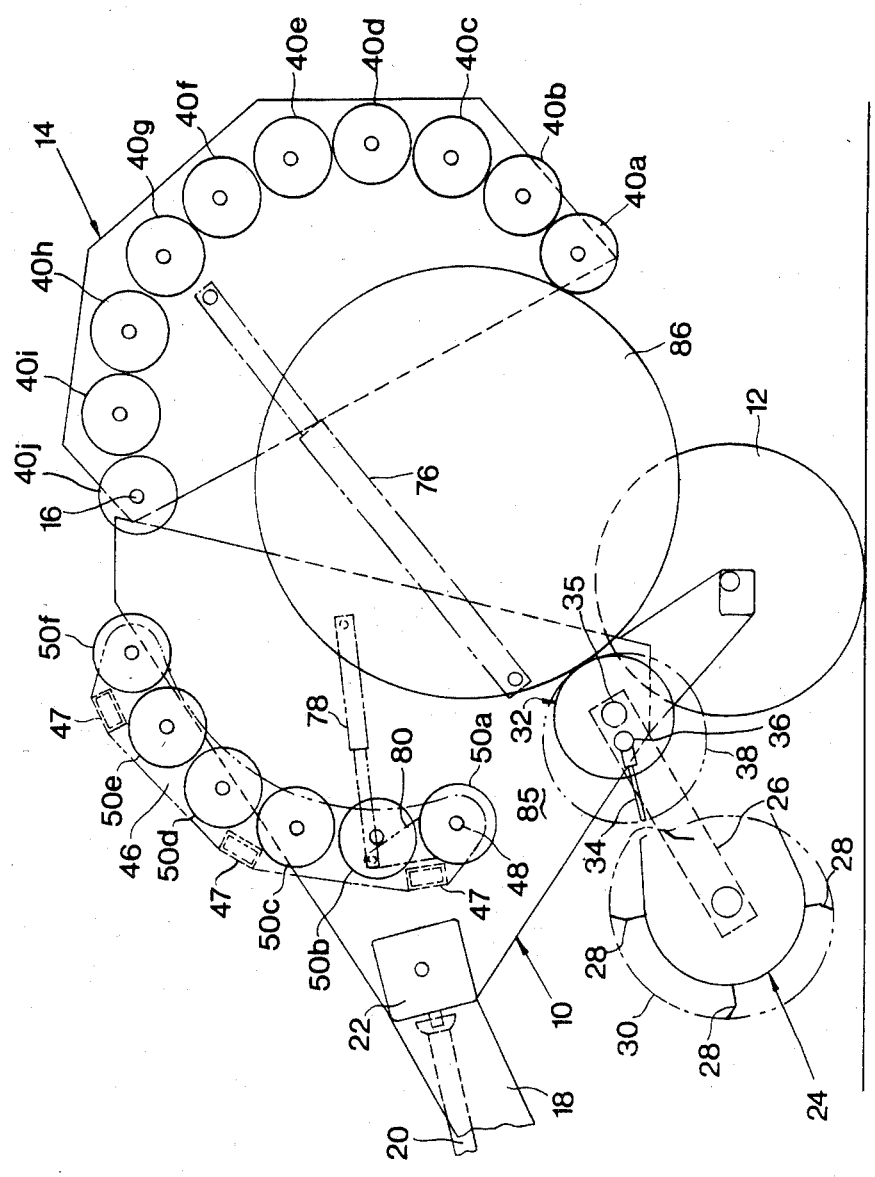
FIG. 3 is a side elevational view of the baler of FIGS. 1 and 2 during discharge of a bale therefrom.

When the baler is empty as seen in FIG. 1, the arms 46 are in their bale starting position and the rollers 50a through 50j cooperate with the feeder drum 32 and with only the rollers 40a through 40d in the rear frame 14 to define a bale starting chamber 84 which is elongated in a generally horizontal direction. The roller 50a is spaced from the feeder drum 32 a sufficient distance to provide an inlet 85 to the bale starting chamber 84. As the baler is pulled across the field by a tractor, the pickup fingers 28 and the fingers 34 of the feeder drum 32 deliver crop material into the bale starting chamber 84 through the inlet 85 to form the core of a roll bale. As the bale increases in diameter, the arms 46 are pivoted upwardly toward the full bale position of FIG. 2 against the force of the hydraulic cylinders 78 or against the force of the spring 82 in the modification shown in FIG. 4. It will be understood that with the arms 46 in the full bale position of FIG. 2, the rollers 50a through 50f cooperate with all of the rollers 40a through 40j to define a bale forming chamber which is generally cylindrical. When a full bale 86 has been formed as shown in FIG. 2, and it is desired to discharge the bale, the hydraulic cylinders 76 are extended thereby pivoting the rear frame 14 upwardly as shown in FIG. 3. The hydraulic cylinders 78 may hold the arms 46 and the rollers 50a through 50f in the full bale position during discharge of the bale. Alternatively, when the springs 82 are used as shown in FIG. 4, the arms 46 and the rollers 50a through 50f are urged by the springs 82 toward the bale starting position to assist in discharging the bale. After the bale is discharged, the hydraulic cylinders 76 are contracted to move the rear frame 14 back to the position of FIG. 1 and the arms 46 are returned to the bale starting position so that the baler is ready to form another bale.

Figure 5:
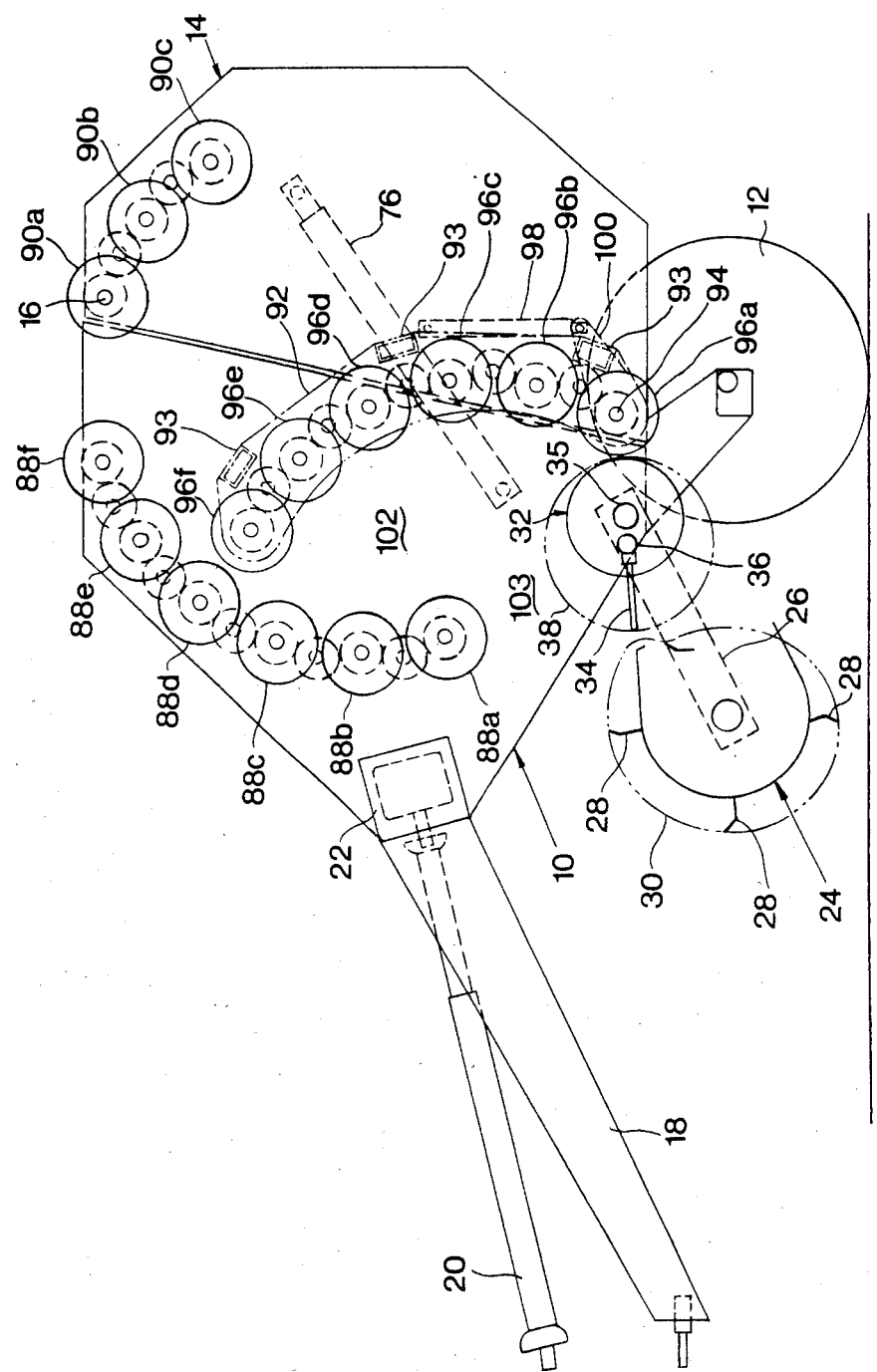
FIG. 5 is a side elevational view of a round baler according to another embodiment of the present invention taken when the baler is empty.

Referring now to FIG. 5, a round baler according to another embodiment of the present invention includes a set of rollers 88a through 88f rotatably mounted in fixed positions in the base frame 10 and extending transversely between the side walls 11 thereof. Another set of rollers 90a through 90c is rotatably mounted in fixed positions in the rear frame 14 and extends transversely between the side walls 15 thereof. A pair of arms 92, which are similar to the arms 46 previously described, are pivoted at one end on stub shafts 94 mounted in the side walls 15 of the rear frame 14. The arms 92 are interconnected by beams 93. A further set of rollers 96a through 96f is rotatably carried by the arms 92 and extends transversely between the arms 92. A pair of hydraulic cylinders 98 are connected between lever portions 100 of the arms 92 and the side walls 15 of the rear frame 14.

The rollers 88a through 88f, 90a through 90c, and 96a through 96f are essentially of the same construction as the rollers 40a through 40j and 50a through 50f previously described. The shaft of the roller 90a is coaxial with and fixed to the stub shafts 16, and the shaft of the roller 96a is coaxial with and fixed to the stub shafts 94. The rollers of each set shown in the embodiment of FIG. 5 are interconnected by the same type of arrangement of spur gears and intermediate gears already described. The various parts of the baler of FIG. 5 are driven from the PTO of a tractor in the manner already described with the addition of another chain extending from a sprocket which drives the roller 90a to another sprocket which is fixed to one of the stub shafts 94 to drive the roller 96a. The rollers 88a through 88f, 90a through 90c and 96a through 96f are each rotated in a clockwise direction as viewed in FIG. 5.

Figure 6:
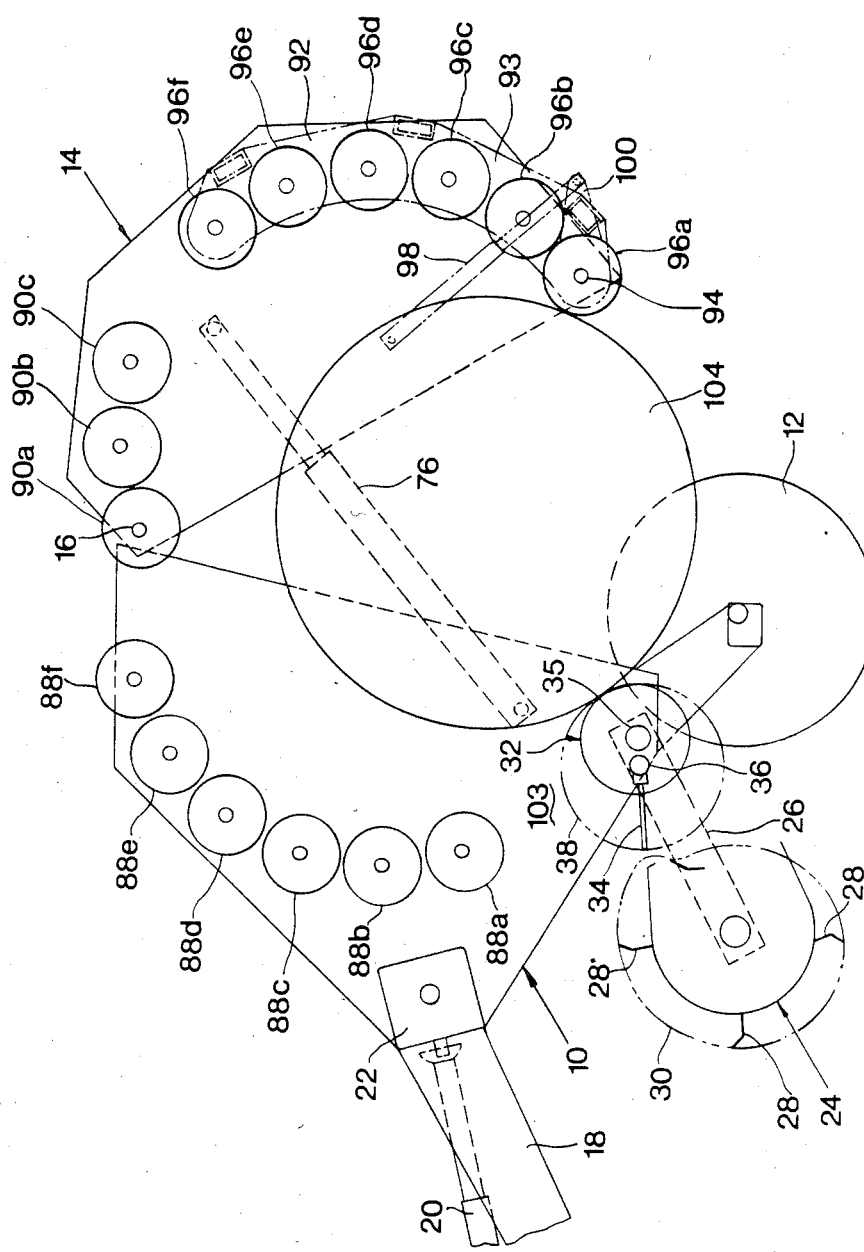
FIG. 6 is a side elevational view of the baler of FIG. 5 during discharge of a bale therefrom.

When the baler of FIG. 5 is empty, the arms 92 are in a bale starting position so that the rollers 96a through 96f carried thereon cooperate with the feeder drum 32 and with only the rollers 88a through 88c to define a bale starting chamber 102 which is elongated in a generally vertical direction. The roller 88a is spaced from the feeder drum 32 a sufficient distance to provide an inlet 103 to the bale starting chamber 102. The pickup 24 and the feeder drum 32 deliver crop material into the bale starting chamber 102 through the inlet 103 to form the core of a roll bale. As the bale increases in diameter, the arms 92 are moved toward a full bale position against the force of the hydraulic cylinders 98. It will be understood that with the arms 92 in their full bale position, the rollers 96a through 96f cooperate with all of the rollers 88a through 88f and 90a through 90c to define a bale forming chamber which is generally cylindrical. When a full bale has been formed and it is desired to discharge the bale, the hydraulic cylinders 76 are extended, thereby pivoting the rear frame 14 upwardly as shown in FIG. 6. The hydraulic cylinders 98 hold the arms 92 and the rollers 96a through 96f in the full bale position during discharge of the bale 104. After the bale 104 is discharged, the hydraulic cylinders 76 are contracted to move the rear frame 14 back to the position of FIG. 5 and the arms 92 are returned to the bale starting position so that the baler is ready to form another bale.

It will be understood that in the round balers according to the embodiments of FIGS. 1 and 5, the number of rollers in each set may be increased or decreased if desired. For example, in a modified form of the baler of FIG. 5, the roller 90c will be added to the set of rollers 96a to 96f are carried on the arms 92. Also, the term "rollers" as used herein should not be limited to the particular type and shape of rollers 40a to 40j, 50a to 50f, 88a to 88f, 90a to 90c, and 96a to 96f disclosed herein. For example, the rollers may have a different shape. Furthermore, the rollers may be replaced by other bale forming members.

The following claims are intended to cover all modifications and variations of the preferred embodiments of the invention disclosed herein without departing from the spirit and scope of the invention.

We claim:

1. In a round baler having a base frame, a rear frame pivotally connected to said base frame, a first set of rollers rotatably mounted in fixed positions in said base frame and extending transversely of said base frame, the improvement comprising:

arm means pivoted on said rear frame for movement between a bale starting position and a full bale position, a second set of rollers rotatably carried on said arm means and extending transversely of said rear frame, said second set of rollers cooperating with only part of the rollers of said first set of rollers to define a bale starting chamber which is elongated in a generally vertical direction when said arm means is in said bale starting position, and said second set of rollers cooperating with all of the rollers of said first set of rollers to define a bale forming chamber which is generally cylindrical when said arm means is in said full bale position.

2. The improvement of claim 1, further comprising a third set of rollers rotatably mounted in fixed positions in said rear frame and cooperating with said first and second sets of rollers to define said bale forming chamber.

3. The improvement of claim 1, wherein said arm means comprise a pair of arms each pivoted at one end on said rear frame, and wherein said second set of rollers extends between said pair of arms.

4. The improvement of claim 3, further comprising means connected between said pair of arms and said rear frame to move said pair of arms into said bale starting position.

5. The improvement of claim 4, wherein said means comprises hydraulic cylinders.

6. The improvement of claim 1, further comprising a feeder drum rotatably mounted on said base frame and cooperating with said first and second sets of rollers to define said bale starting chamber.

7. The improvement of claim 6, wherein said feeder drum includes a cylinder mounted for rotation on said base frame and a plurality of fingers which retract into and project from said cylinder during rotation of said cylinder.

8. The improvement of claim 6, wherein one roller of said first set of rollers is spaced from said feeder drum to define an inlet to said bale starting chamber.

9. The improvement of claim 1, further comprising drive means for rotating the rollers of said first and second sets of rollers in the same direction.

10. The improvement of claim 9, wherein said drive means includes spur gears connected to the rollers of said first and second sets of rollers and intermediate gears mounted on said base frame and said arm means in intermeshing engagement with said spur gears.

11. The round baler of claim 1 wherein said arm means extends into said base frame when in said bale starting position and wherein said arm means is contained within said rear frame when in said full bale position.

12. In the round baler of claim 11, wherein said rear frame is pivotable upwardly away from said base frame to discharge a bale from said bale forming chamber.

13. A round baler comprising:
a base frame;
a rear frame pivotally connected to said base frame;
a first set of rollers rotatably mounted in fixed positions in said base frame and extending transversely of said base frame;
arm means pivoted on said rear frame for movement between a bale starting position and a full bale position;
a second set of rollers rotatably carried on said arm means and extending transversely of said rear frame;
said second set of rollers cooperating with only part of the rollers of said first set of rollers to define a bale starting chamber which is elongated in a generally vertical direction when said arm means is in said bale starting position; and
said second set of rollers cooperating with all of the rollers of said first set of rollers to define a bale forming chamber which is generally cylindrical when said arm means is in said full bale position.

14. The round baler of claim 13, further comprising a third set of rollers rotatably mounted in fixed positions in said rear frame and cooperating with said first and second sets of rollers to define said bale forming chamber.

* * * * *